United States Patent [19]
Curtiss et al.

[11] Patent Number: 5,212,748
[45] Date of Patent: May 18, 1993

[54] FIBER OPTIC MIXER AND SPECTROMETER

[76] Inventors: Lawrence E. Curtiss, P.O. Box 177, Concord, Mass. 01742; Richard D. Driver, 67 Pleasant St., Cambridge, Mass. 02139

[21] Appl. No.: 551,554

[22] Filed: Jul. 11, 1990

[51] Int. Cl.⁵ .......................... G02B 6/26; G01B 9/02; H01J 5/16
[52] U.S. Cl. .......................... 385/32; 385/31; 385/38; 385/33; 385/115; 356/346; 250/227.11; 250/227.18
[58] Field of Search ............... 350/96.15, 96.16, 96.18, 350/96.29, 96.30; 250/227.11, 227.18, 227.19; 356/346; 385/31, 32, 38, 115, 33, 34

[56] References Cited

U.S. PATENT DOCUMENTS

| | | | |
|---|---|---|---|
| 3,883,222 | 5/1975 | Gunderson | 350/96.16 |
| 4,596,466 | 6/1986 | Ulrich | 356/345 |
| 4,750,802 | 6/1988 | Bhagavatula | 350/96.15 |
| 4,790,655 | 12/1988 | Yamamoto et al. | 356/345 |
| 4,826,275 | 5/1989 | Heinzman | 350/96.16 |
| 4,877,305 | 10/1989 | Ricciardelli | 350/96.30 |
| 4,900,116 | 2/1990 | Mathis | 350/96.15 |
| 4,915,469 | 4/1990 | Byron et al. | 350/96.16 |
| 4,932,748 | 6/1990 | Ricciardelli | 350/96.30 |
| 4,995,686 | 2/1991 | Blonder et al. | 350/96.15 |
| 5,093,884 | 3/1992 | Gidon et al. | 385/32 |
| 5,101,449 | 3/1992 | Takeuchi et al. | 385/32 |

Primary Examiner—Brian Healy
Attorney, Agent, or Firm—Richard J. Birch

[57] ABSTRACT

A fiber optic mixer is disclosed. A large diameter fiber has a curved radiation input end portion and a straight radiation output end portion. The length of the curved input end portion of the fiber is long enough to cause all entering radiation to hit the reflecting core boundary while the length of the straight output end portion is long enough to provide sufficient internal reflections to mix the radiation entering at the input end to produce a nearly zero correlation between an entering ray position and its position as an exiting ray. The fiber optic mixer can be used to efficiently couple radiation from the source or interferometer of a Fourier Transform Infrared Spectrometer (FT-IR) to a multiplicity of optical fibers so that each fiber receives substantially identical spectral, angular and intensity distributions of radiation.

19 Claims, 5 Drawing Sheets

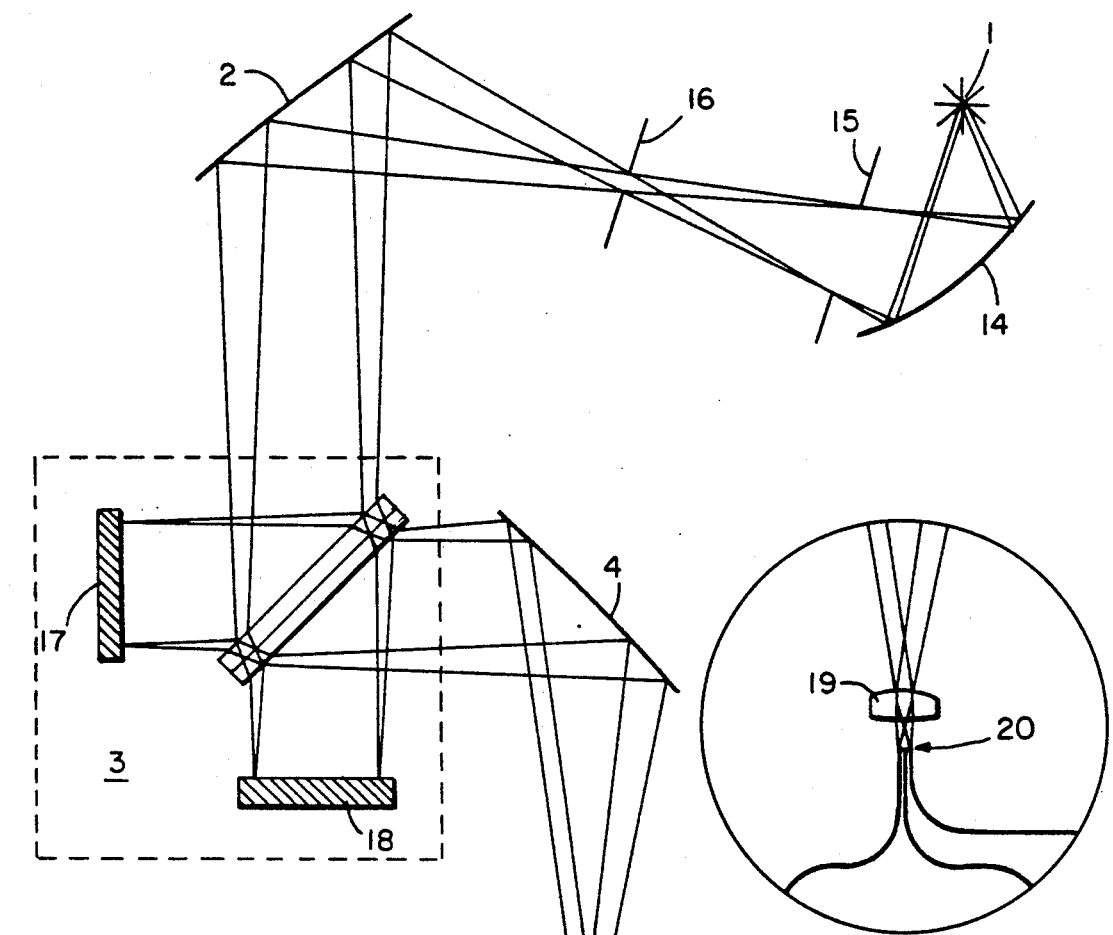
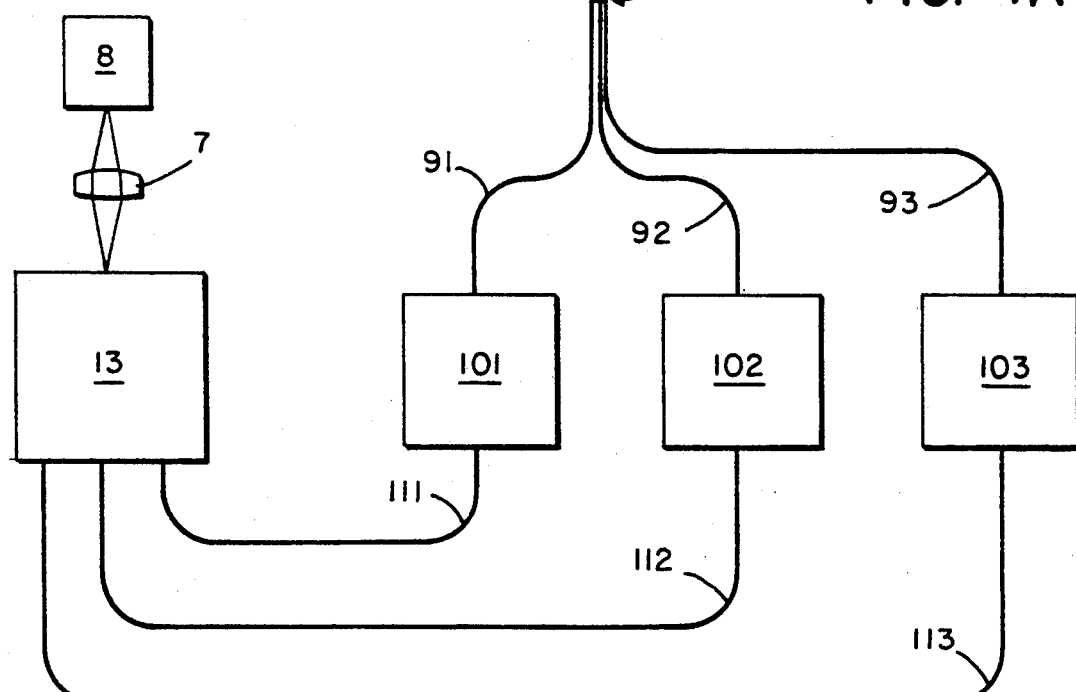
FIG. 4A
FIG. 4

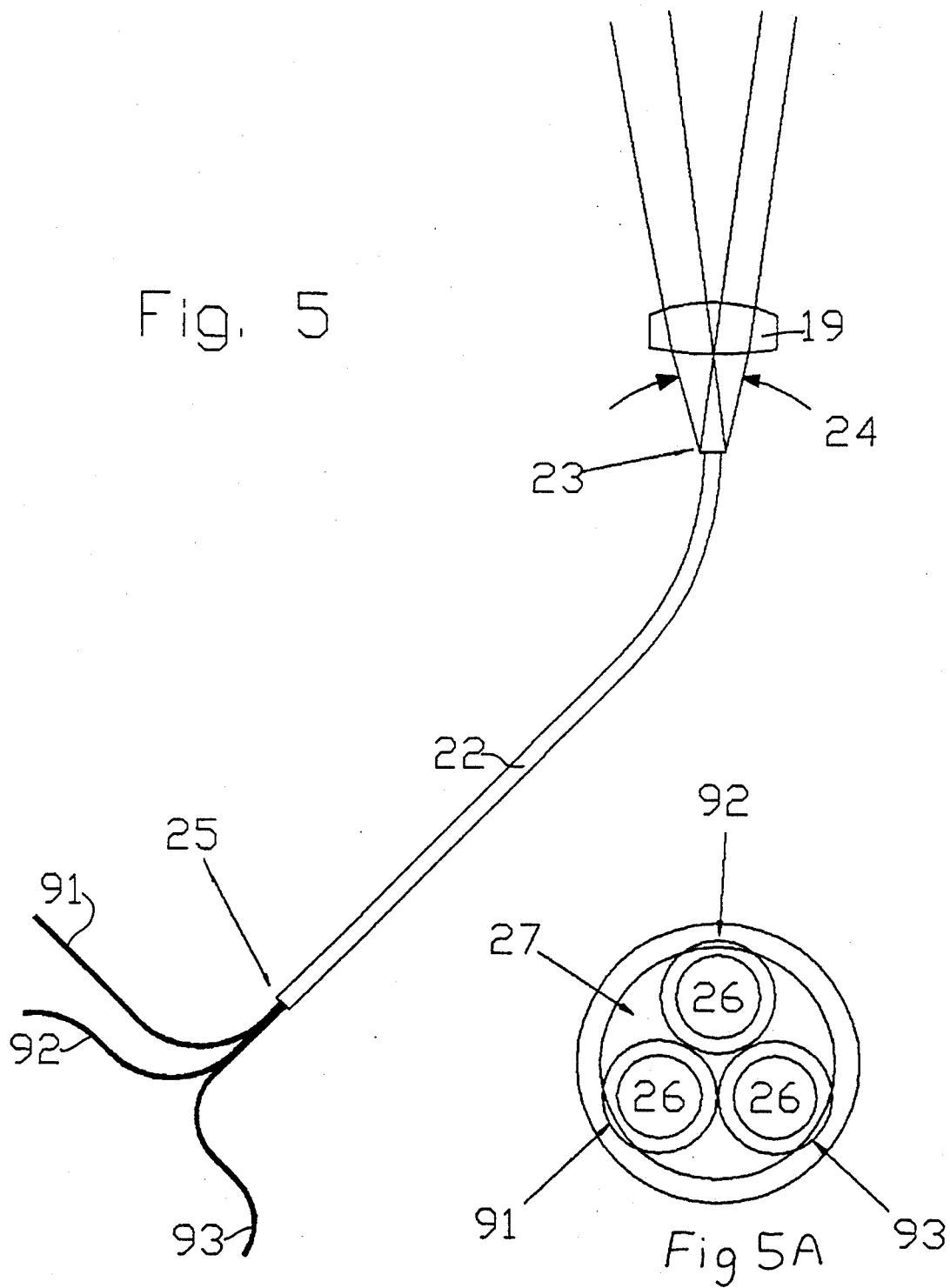

FIBER OPTIC MIXER AND SPECTROMETER

BACKGROUND OF THE INVENTION

The present invention relates in general to the apportionment of nearly identical distribrtions of radiation among a number of receiving optical fibers and, more specifically, to a radiation mixing device that efficiently couples radiation from the source or interferometer of a Fourier Transform Infrared Spectrometer (FT-IR) to a multiplicity of optical fibers so that each fiber receives substantially identical spectral, angular and intensity distributions of radiation.

The recent development of heavy metal fluoride glasses ("HMFG") now makes it possible to obtain spectra from remote sensors, such as transmission cells, for wavelengths from the visible out to more than four micrometers. This technology is not yet widely used, but the potential for large savings in process control applications in the petroleum, chemical and food industries hold promise for the rapid growth of remote spectroscopy.

A typical fiber optic circuit conducts light from the source and wavelength selection portion of the analyzer to the remote sensor and back through another fiber to the detector portion of the analyzer. The relatively high cost of the HMFG fibers makes it advantageous to use single, small diameter fibers to connect the analyzer to the sensor. A small diameter fiber carries less energy than does a large fiber and requires the use of a more sensitive analyzer such as a Fourier Transform Infrared Spectrometer. Since the sensitivity of the analyzer is generally related directly to the cost of the analyzer, it becomes economically desirable to share a single analyzer among several sensors.

Furthermore, there is a need for easily and reliably switching from one fiber circuit to another and for switching between the sample circuit and a reference circuit. This is required in most spectrometers for maintaining the accuracy necessary for quantitative measurements.

There are, however, some considerations that complicate optical switching in an FT-IR spectrometer. The heart of an FT-IR spectrometer is a Michelson interferometer. A typical layout of a traditional FT-IR spectrometer is shown in FIG.

A source 1 radiates light onto a collimator 2 which sends a collimated beam into the Michelson interferometer 3. Optical element 4 focuses the beam onto the sample 5 in the sample chamber 6. From there the beam continues on to optical element 7 which in turn focuses tha beam onto detector 8.

A typical layout of an FT-IR spectrometer configured for remote spectroscopy using a single optlcal fiber is shown in FIG. 2. It differs from the tradLtional FT-IR spectrometer in that optical element 4 is arranged to focus the beam on the end of an optical fiber 9 which carries the light to a remote sample sensor 10 from which light is carried by a second fiber 11 back to optical element 7 which focuses the light onto detector 8. No basic difficulties are encountered by introducing the fibers that cannot be accommodated by appropriate selection of the optical elements and the detector.

The difficulties are greater, however, when one attempts to use more than one fiber in connection with the Michelson interferometer. One approach is to use two optical switches 12 and 13 as depicted in FIG. 3. Three remote fiber optical circuits are shown by way of example. Optical element 4 focuses the beam onto the input of the optical switch 12. Depending on the position of the optical switch, a portion of the beam is directed into one of the fibers 91, 92 or 93, and is carried by the fiber to a corresponding optical circuit, such as a remote sensor indicated as 101, 102, or 103, and then back to optical switch 13 along corresponding fibers 111, 112, or 113. Provided that switch 13 is set for the corresponding fiber, the beam is directed by the switch onto optical element 7 which focuses it onto detector 8. Although this approach is a straightforward extension of the single fiber system depicted in FIG. 2, it suffers from requirlng two optical switches that are usually rather expensive when constructed to be reliable for the analog signals used in fiber spectroscopy.

A second approach is to use a single optical switch and make use of the large etendue or light gathering power of the FT-IR spectrometer. The complicationr introduced by this approach are related to the spatial extents of the source and the bundle of fibers into whicl the light is launched. This approach is depicted in FIG. 4.

The optics in FIG. 4 have been expanded to show in more detail the passage of beams through the irterferometer 3 and the relationship between the field stop (Jacquinot stop) and the pupil stop. The light from the extended source 1 is focussed by element 14 onto field stop 16. Optical element 2 not only collimates the light from each point within the field stop, but also forms images of the pupil stop 15 typically at or near the mirrors 17 and 18. The pupil limits the angular extent of the rays passing through the field stop. Reciprocally, the field stop limits the angular extent of the rays passing through any subsequent image of the pupil. Due to the spatial extents of the source and the field stop, the beam within interferometer is not truly collimated, but diverges by typically one or two degrees.

It should be noted that the interference of beams within the interferomoter depends not only on wavelength (the parameter of interest to the spectroszopist), but also on the positions of the mirrors and the angle of refleotion from the mirrors. An FT-IR speotrometer achieves its highest resolution as the Jaoquinot interferometer is reduced. It should be noted further that since the optical throughput of a typical FT-IR spectrometer is much greater than the throughput of an optical fiber, a multiplicity of fibers can be coupled to the interferometer without degrading its resolution.

A short focal length element 19 is pcsitioned about one focal length ahead of where the field stop image would be formed by optical element 4 and the fiber ends 20 are positioned at the small image of the field stop formed by element 19. Each fiber has a different lccation within the field stop image. Consequently, the rays entering each fiber correspond to rays having a different direction through the interferometer. Moreover, since the field stop is located at an image of the source 1, each fiber samples a different part of the source.

In principle, one can eliminate the problem of different sets of angles in the interferometer by positioning the fibers on a circle for which the center is aligned with rays that are perpendicular to the mirrors 17 and 18 in the interferometer. However, in practice this is a difficult alignment to achieve, and if it is not achieved, the wavelength accuracy from each fiber circuit can be different due to the differences in mean path length resulting from the differences in angles in the interferometer. Furthermore, even if the angular variation is eliminated, the fact that each fiber is sampling radiation from a different part of the source will lead to long-term instability due to changing position and temperature variations of the source.

FIG. 4A shows a variation which in principle eliminates these problems. Optical element 4 focuses the field stop 16 onto the short focal length optical element 19 which focuses a small image of the pupil 15 onto the ends 20 of the tightly clustered fibers 91, 92, and 93. The light hitting each fiber is now averaged over a substantially greater part of the source limited usually by the numerical aperture of the fiber. In principle, the fibers can be aligned so that the axis of each fiber passes through the same point in the image of the field stop to assure that the mean path length of the rays in the interferometer are identical for each fiber. In practice this is difficult because it does not permit the fiber axes to be parallel at the ends 20, and, furthermore, it is complicated by the fact that in many spectrometers the image of the pupil is partially obscured by small mirrors mounted in the beam in the interferometer to monitor the position of the moving mirror.

It is accordingly a general object of the invention to provide a solution to these problems.

It is a specific object of the invention to provide a fiber optical mixer.

It is another object of the invention to provide a fiber optical mixer for use in Fourier Transform Infrared Spectrometers (FT-IR).

It is a further object of the invention to provide a fiber optical mixer that provides substantially identical spectral, angular, and intensity distributions of radiation to a plurality of optical fibers.

BRIEF DESCRIPTION OF THE INVENTION

The fiber optical mixer of the present invention utilizes a large diameter fiber that has a curved radiation input end portion and a straight radiation output end portion. The curved input end portion and straight output end portion of the fiber provide that all entering radiation hits at least one reflecting core boundary during passage through the mixer.

In the preferred embodiment, the length of the straight radiation output end portion is long enough to provide multiple internal reflections to mix radiation entering at the curved input end portion to produce a nearly zero correlation between the position of an entering ray and its position as an exiting ray.

BRIEF DESCRIPTION OF THE DRA1;INGS

The objects and features of the invention will best be understood from a detailed description of a preferred embodiment thereof, selected for purposes of illustration and shown in the aooompanying drawings in which:

FIG. 4 is a diagrammatic view of an FT-IR spectrometer configured for remote spectroscopy using a single optical switch, multiple optical fibers and an optical element for imaging the FT-IR field stop on the input ends of the multiple optical fibers;

FIG. 4A is a diagrammatic view showing a portion of the FT-IR spectrometer of FIG. 4 in which the optical element images the pupil of the FT-IR spectrometer on the input ends of the multiple optical fibers;

FIG. 5 is a diagrammatic view of the fiber of the optical mixer of the present invention as used in the FT-IR spectrometer of FIG. 4; and, FIG. 5A is a diagrammatic view of the interface between the output end of the fiber optical mixer and the input ends of the multiple optical fibers.

DETAILED DESCRIPTION OF A PREFERRED EMBODIMENT

Figure 1:
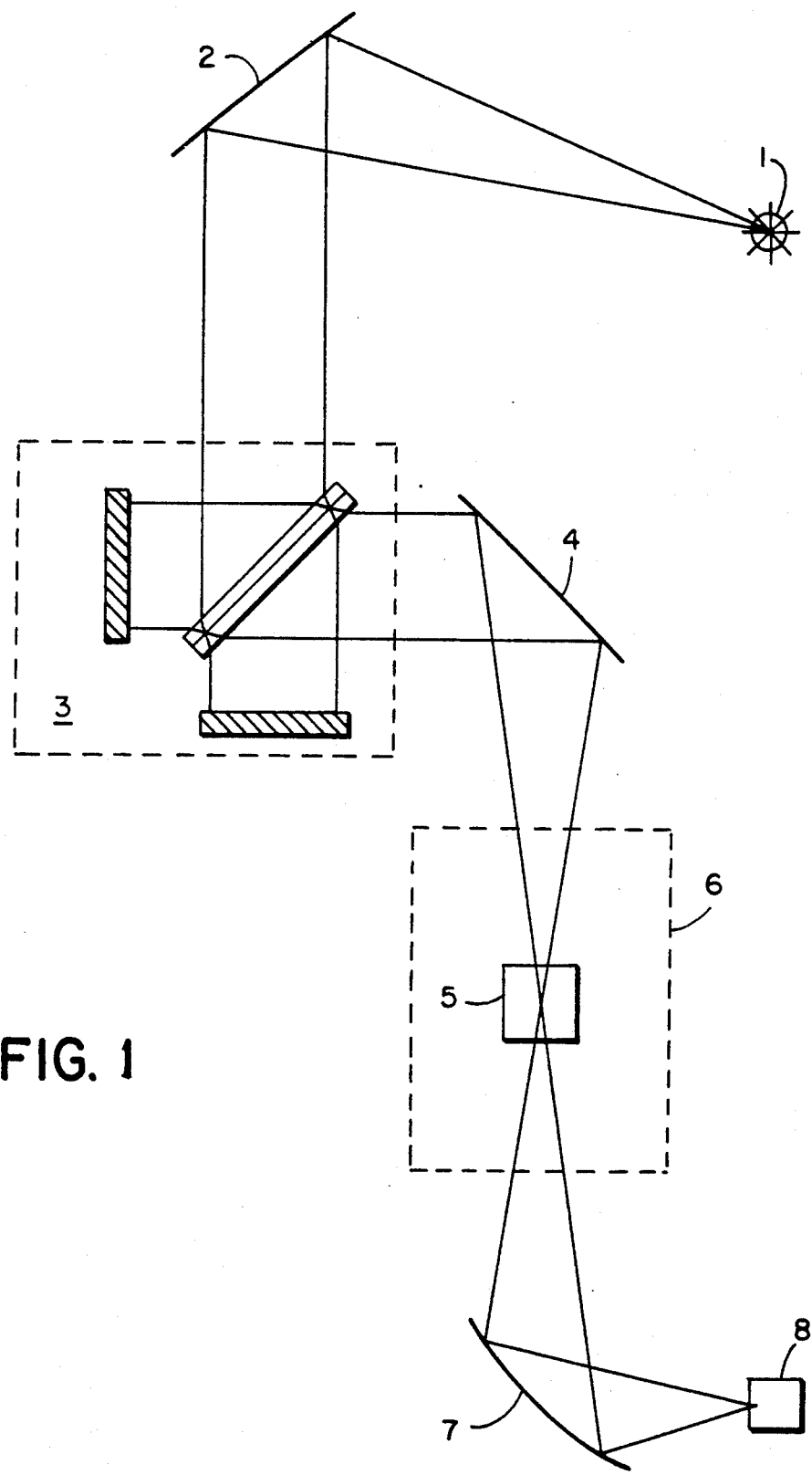
FIG. 1 is a diagrammatic view of a prior art FT-IR spectrometer.
Figure 2:
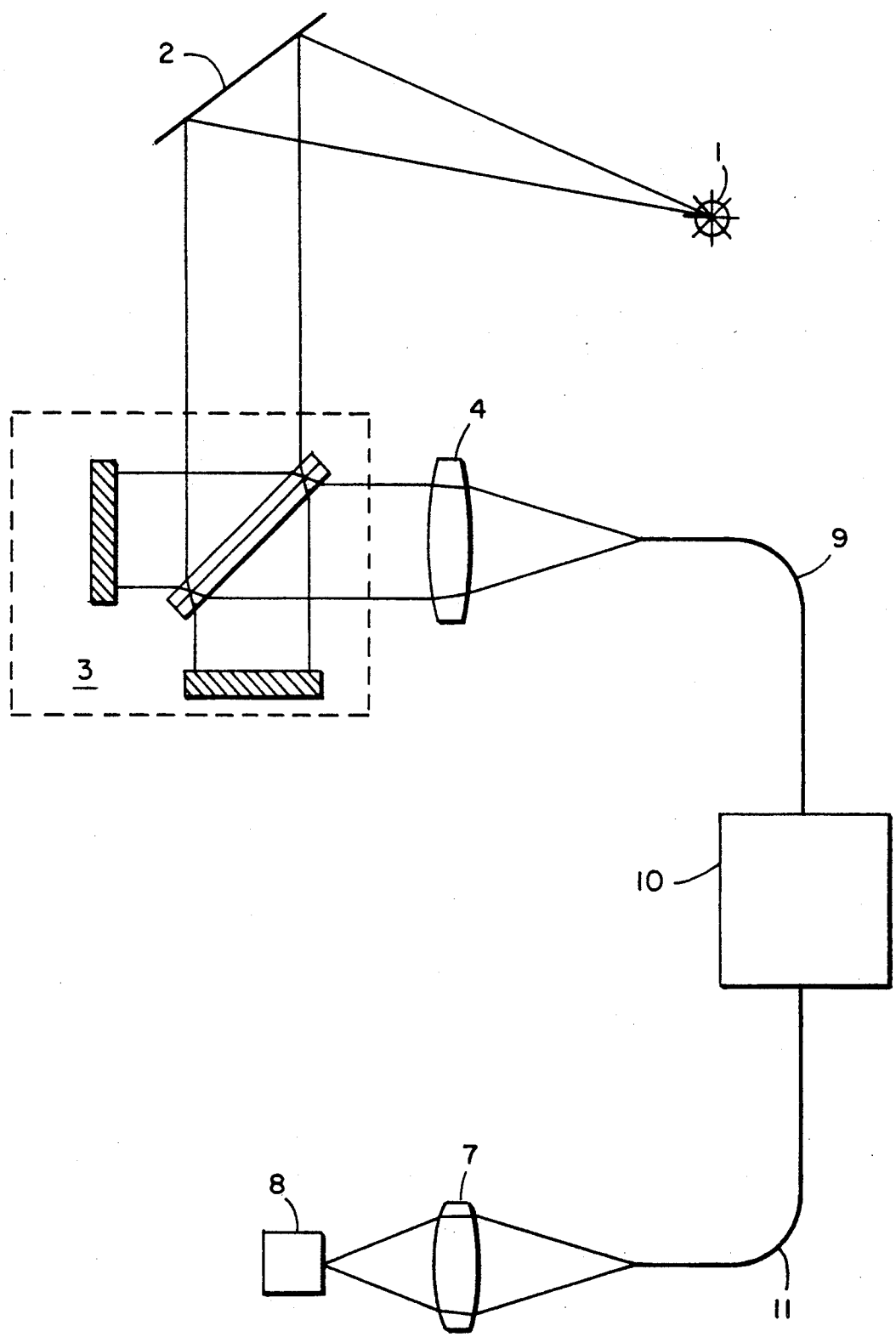
FIG. 2 is a diagrammatic view of a prior art FT-Ir spectrometer configured for remote spectroscopy using a single optical fiber.
Figure 3:
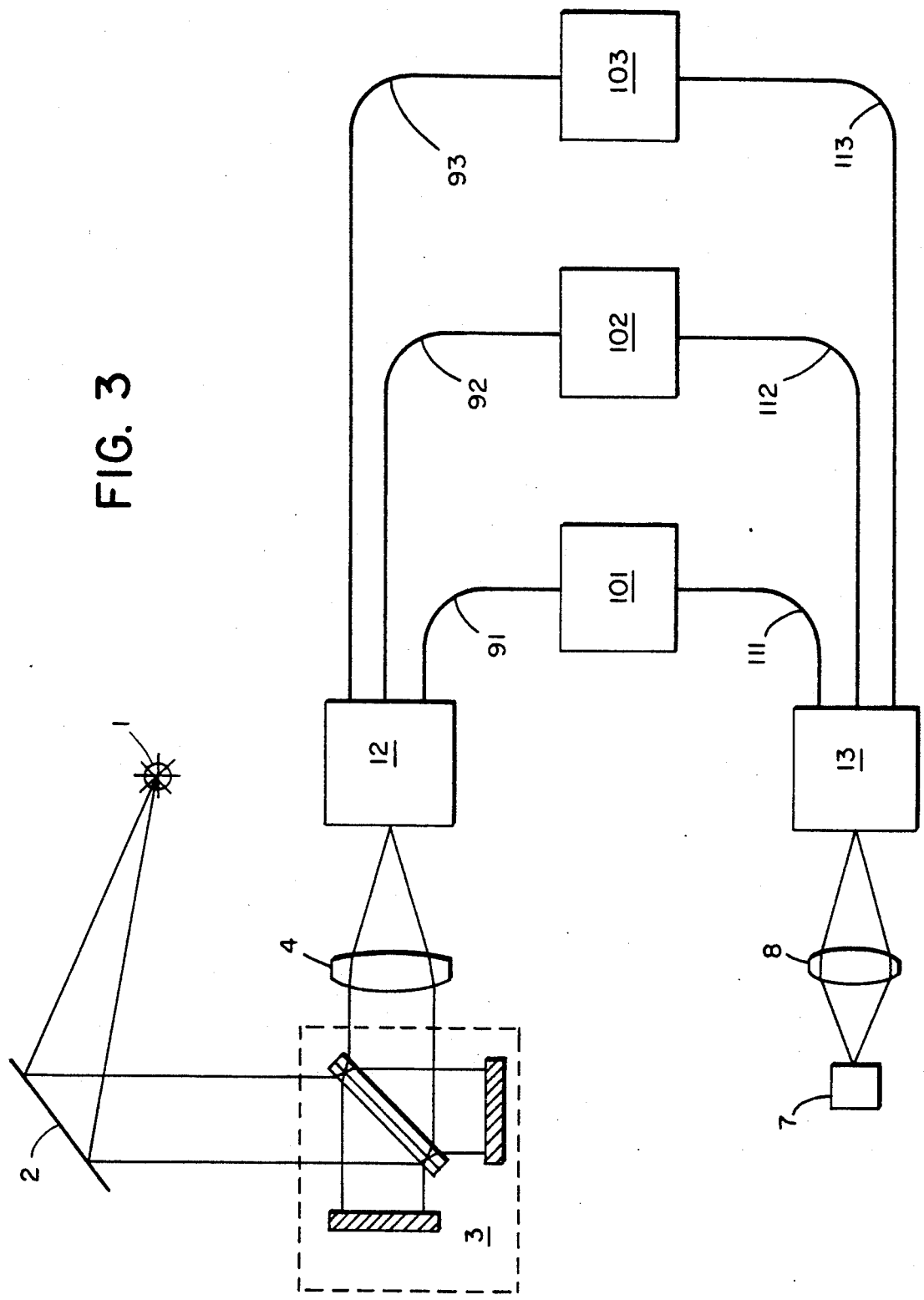
FIG. 3 is a diagrammatic view of an FT-IR spectrometer configured for remote spectroscopy using two optical switches and multiple optical fibers.

FIG. 5 depicts in diagrammatic form an embodiment of a fiber optical mixer. Optical elements 19 (and 4) form an incident cone of light having an angle 24 that is a little larger than the cone of light that can be transmitted by fiber optic mixer 22 and optical fibers 91, 92 and 93. The input end 23 of the fiber optical mixer 22 is positioned at this concentration of radiation. It will be appreciated that, if desired, the concentration of radiation can be an image of the field stop, the pupil stop or of some plane in between the stops in an FT-IR spectrometer.

The diameter of the transmitting core 27 of the mixer fiber is large enough to completely cover the cores 26 of fibers 91, 92, and 93, which are abutted to the other end of the mixer at the interface 25 as shown in FIG. 5A. For optimum long-term stability, it is desirable that the fiber core of the mixer be only a little smaller than the diameter of the image. This allows averaging over the greatest area of the source.

The minimum length of the fiber optic mixer is proportional to its core diameter. This can best be understood by considering the operation of the mixer. First, consider a ray propagating along a straight section of fiber. The nearest approach to the fiter axis of a particular ray is invariant. Looking along the fiber axis, any ray not passing through the axis appears to take a broken-line corkscrew path reflecting frox the core/clad interface and tangent to the circle defined by the radius of nearest approach to the axis. If the fiber is long compared to its diameter, a small change in angle rr distance from the axis will make a large change on the position from which the ray emerges from the other end. As a practical matter, the light entering at any point on the input face of a long fiber appears to be smeared over the output face with great axial symmetry.

This is generally true for light making many reflections, but is not the case for light entering the fiber parallel to the axis. In order to force the smearing of light entering parallel to the axis, tha first part of the fiber is curved over a distance long enough to cause all entering light to hit the reflecting core boundary. The curved section is followed by a straight section long enough to achieve thorough axial smearing.

Computer ray tracing demonstrates that a good design for a mixer with a 1 mm diameter core of refractive index 1.5 is 20 mm of length curved to a 50 mm radius followed by 60 to 80 mm of straight fiber. A monotonic correlation function for a given point on the entrance face and a given fiber at the exit face was defined to yield the following values:

1.0—if all the entering rays hit the fiber,
0.0—if the same number of rays hit each fiber, and
1.0—if none of the entering rays hit the fiber Root mean square values of the correation function were calculated for a grid of 48 input points and a set of 7 fibers at the exit end. Each fiber core diameter was 0.25 mm. Results are tabulated below:

| Lengths | | RMS Correlation Values | |
|---|---|---|---|
| Curved | Straight | On Axis Fiber | .34 mm from axis |
| 0.0 | 0.0 | 1.00 | 1.00 |
| 0.0 | 80.0 | .47 | .12 |
| 20.0 | 60.0 | .12 | .08 |

Having described in detail a preferred embodiment of our invention, it will now be apparent to those skilled in the art that numerous modifications can be made therein without departing from the scope of the invention as defined in the following claims. For example, the optical circuits 101, 102 and 103 can comprise remote sensors as illustratively described above, or at least one sample circuit and at least one reference circuit or two remote sensors and a reference circuit and the like.

What we claim is:

1. A fiber optic mixer comprisign an optical fiber having a curved input end portion and a straight output end portion, said curved input end portion having a radius of curvature greater than 25 times the diameter of the core of the optical fiber.

2. The fiber optic mixer of claim 1 further comprising a plurality of optical fibers optically coupled to the output end portion of the optical fiber of said mixer, with each of said plurality of optical fibers having a core diameter less than the core diameter of the optical fiber of said mixer.

3. The fiber optic mixer of claim 2 wherein the core of each of said plurality of optical fibers is optically coupled to the core of the optical fiber of the mixer so that it will be fully filled with radiation that exits from the output end of the optical fiber of said mixer.

4. In an FT-IR spectrometer having a radiation source, an interferometer and a plurality of optical circuits that is optically coupled to an optical switch that in turn is optically coupled to a detector, the improvement comprising:
   an optical fiber mixer having a curved input end portion and a straight output end portion such that any ray entering the input end portion of the optical fiber will have at least one reflection within the optical fiber before exiting from the output end portion of the optical fiber;
   a plurality of optical fibers optically coupled to the output end portion of the optical fiber of said mixer with each of said plurality of optical fibers having a core diameter less than the core diameter of the optical fiber of said mixer and said plurality of optical fibers being optically coupled to the corresponding plurality of optical circuits; and,
   means for concentrating the radiation from the interferometer on the input end of said fioer optic mixer.

5. The FT-IR spectrometer of claim 4 wherein said FT-IR spectrometer has a field stop and wherein said radiation concentrating means comprises means for forming an image of the field stop on the input end of said optical fiber mixer.

6. The FT-IR spectrometer of claim 4 wherein said FT-IR spectrometer has a pupil stop and wherein said radiation concentrating means comprises means for forming an image of the pupil stop on the input end cf said optical fiber mixer.

7. The FT-IR spectrometer of claim 4 wherein said FT-IR spectrometer has field and pupil stops and wherein said radiation concentrating means comprises means for forming an image of a plane between said field and pupil stops on the input end of said optical filber mixer.

8. In an FT-IR spectrometer having a radiation source, an interferometer and a plurality of optical circuits that is optically coupled to an optical switch that in turn is optically coupled to a detector, the improvement comprising:
   an optical fiber mixer having a curved input end portion and a straight output end portion, said curved input end portion having a radius of curvature equal to or greater than 25 times the diameter of the core of the optical fiber mixer;
   a plurality of optical fibers optically coupled to the output end portion of the optical fiber mixer with each of said plurality of optical fibers having a core diameter less than the core diameter of the optical fiber mixer and said plurality of optical fibers being optically coupled to the corresponding plurality of optical circuits; and,
   means for concentrating the radiation from the interferometer on the input end of said optical fiber mixer.

9. The FT-IR spectrometer of claim 8 wherein said FT-IR spectrometer has a field stop and wherein said radiation concentrating means comprises means for forming an image of the field stop on the input end of said optical fiber mixer.

10. The FT-IR spectrometer of claim 8 wherein said FT-IR spectrometer has a pupil stop and wharein said radiation concentrating means comprises means for forming an image of the pupil stop on the input end of said optical fiber mixer.

11. The FT-IR spectrometer of claim 8 wherein said FT-IR spectrometer has field and pupil stops and wherein said radiation concentrating means comprises means for forming an image of a plane between said field and pupil stops on the input end of said optical fiber mixer.

12. In an FT-IR spectrometer having a radiation source, an interferometer and a plurality of optical circuits that is optically coupled to an optical switch that in turn is optically coupled to a detector, the improvement comprising:
   an optical fiber mixer having a curved input end portion and a straight output end portion, said curved input end portion having a curvature such that the average number of reflections in the curved portion of entering radiation is greater than 2;
   a plurality of optical fibers optically coupled to the output end of said optical fiber mixer with each of said plurality of optical fibers having a core diameter less than the core diameter of the optical fiber mixer and said plurality of optical fibers being optically coupled to the corresponding plurality of optical circuits; and,
   means for concentrating the radiation from the interferometer on the input end of said optical fiber mixer.

13. The FT-IR spectrometer of claim 12 wherein said FT-IR spectrometer has a field stop and wherein said radiation concentrating means comprises means for forming an image of the field stop on the input end of said optical fiber mixer.

14. The FT-IR spectrometer of claim 12 wherein said FT-IR spectrometer has a pupil stop and wherein said radiation concentrating means comprises means for forming an image of the pupil stop on the input end of said optical fiber mixer.

15. The FT-IR spectrometer of claim 12 wherein said FT-IR spectrometer has field and pupil stops and wherein said radiation concentrating means comprises means for forming an image of a plane between said field and pupil stops on the input end of said optical fiter mixer.

16. The FT-IR spectrometer of claims 4, 8 or 12 wherein said plurality of optical circuits comprises a plurality of remote sensors.

17. The FT-IR spectrometer of claims 4, 8 or 12 wherein said plurality of optical circuitr comprises a sample optical circuit and a reference optical circuit.

18. The FT-IR spectrometer of claims 4, 8 or 12 wherein said plurality of optical circuits comprises at least one sample circuit and at least one reference circuit.

19. The FT-IR spectrometer of claims 4, 8 or 12 wherein said plurality of optical circuits comprises at least two remote sensors and at least one reference circuit.

* * * * *